(12) United States Patent  
Kuji

(10) Patent No.: US 7,079,205 B2
(45) Date of Patent: Jul. 18, 2006

(54) LIQUID CRYSTAL DISPLAY INCLUDING A DIFFUSION LAYER FOR IMPROVING GRAY LEVEL INVERSION

(75) Inventor: Tatsuaki Kuji, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 108 days.

(21) Appl. No.: 10/944,782

(22) Filed: Sep. 21, 2004

(65) Prior Publication Data

US 2005/0068478 A1    Mar. 31, 2005

(30) Foreign Application Priority Data

Sep. 25, 2003    (JP) .............................. 2003-333727

(51) Int. Cl.
*G02F 1/1335*    (2006.01)
*G02B 5/02*    (2006.01)
(52) U.S. Cl. ...................................... 349/112; 359/599
(58) Field of Classification Search ............... 349/112; 359/599
See application file for complete search history.

(56) References Cited

U.S. PATENT DOCUMENTS

| 5,629,784 A | * | 5/1997 | Abileah et al. ............. 349/112 |
| 5,691,788 A |   | 11/1997 | Kim ............................. 349/96 |
| 5,877,829 A | * | 3/1999 | Okamoto et al. ............. 349/74 |
| 6,424,395 B1 |   | 7/2002 | Sato et al. ................... 349/112 |
| 2003/0117707 A1 | * | 6/2003 | Uchida et al. .............. 359/492 |

FOREIGN PATENT DOCUMENTS

JP    2000-171619    6/2000

* cited by examiner

*Primary Examiner*—Tarifur R. Chowdhury
(74) *Attorney, Agent, or Firm*—Oblon, Spivak, McClelland, Maier & Neustadt, P.C.

(57) ABSTRACT

A single-domain TN mode liquid crystal display includes an array substrate, an counter substrate, a liquid crystal layer that is includes liquid crystal molecules, polarizer plates, and a diffusion layer that is disposed between a surface of the counter substrate and a surface of the polarizer plate. Inversion of luminance at respective gray levels occurs within four levels of 64 gray levels in a case where an off-axis angle toward a major-axis direction of the liquid crystal molecules relative to a normal of the counter substrate is within 50°.

11 Claims, 6 Drawing Sheets

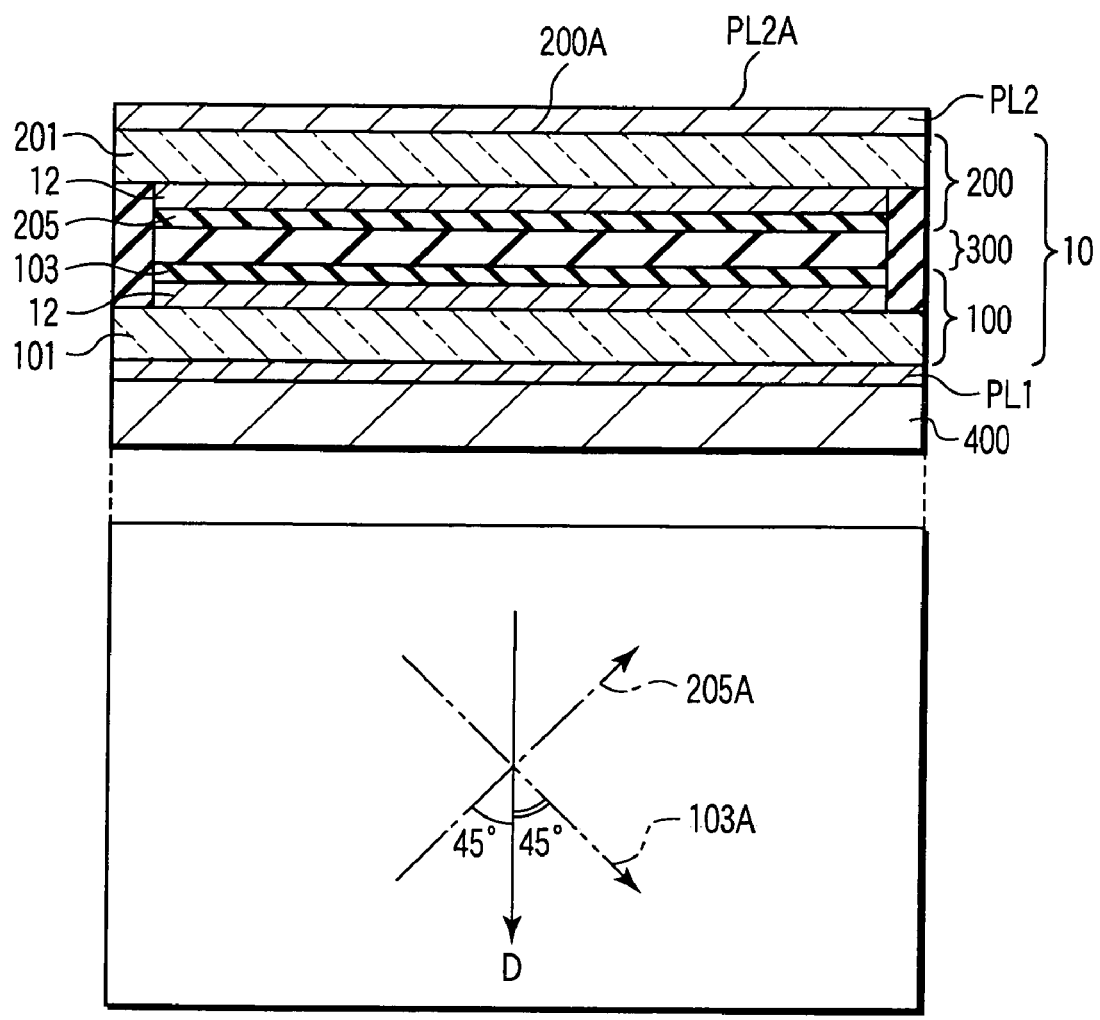
F I G. 4
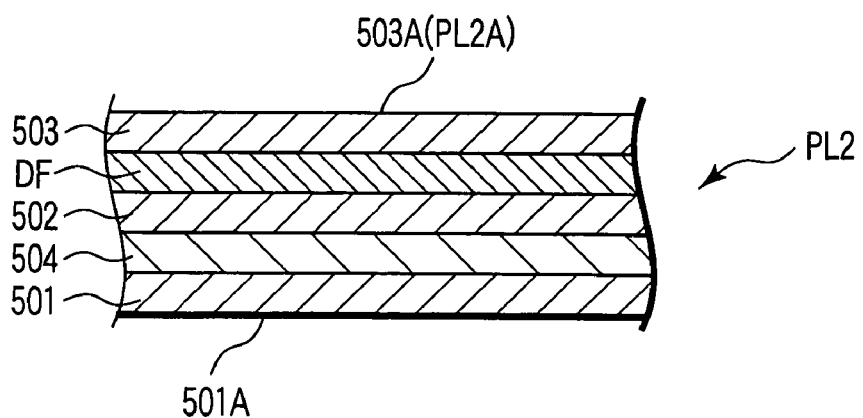
F I G. 5

| Sample | A | B | C | D | E | F |
|---|---|---|---|---|---|---|
| Angle with maximum value (°) | 20 | 20 | 40 | 40 | 60 | 60 |
| Degree of diffusion at maximum value (%) | 85 | 95 | 85 | 95 | 85 | 95 |
| Inversion beginning angle (°) | 25 | 38 | 40 | 50 | 47 | 55 |
| Front-face luminance (%) (Ratio that is set at 100 when angle is 20° and degree of diffusion is 80%) | 100 | 98 | 95 | 92 | 90 | 86 |

| Sample | A | B | C | D | E | F |
|---|---|---|---|---|---|---|
| Angle with maximum value (°) | 20 | 20 | 40 | 40 | 60 | 60 |
| Degree of diffusion at maximum value (%) | 85 | 95 | 85 | 95 | 85 | 95 |
| Inversion beginning angle (°) | 35 | 42 | 55 | 65 | 62 | 71 |
| Front-face luminance (%) (Ratio that is set at 100 when angle is 20° and degree of diffusion is 80%) | 100 | 98 | 95 | 92 | 90 | 86 |

LIQUID CRYSTAL DISPLAY INCLUDING A DIFFUSION LAYER FOR IMPROVING GRAY LEVEL INVERSION

CROSS-REFERENCE TO RELATED APPLICATIONS

This application is based upon and claims the benefit of priority from prior Japanese Patent Application No. 2003-333727, filed Sep. 25, 2003, the entire contents of which are incorporated herein by reference.

BACKGROUND OF THE INVENTION

1. Field of the Invention

The present invention relates generally to a liquid crystal display, and more particularly to a liquid crystal display with a diffusion layer for improving gray level inversion.

2. Description of the Related Art

In recent years, a transmissive liquid crystal display has been applied to various uses. In these uses, the liquid crystal display is often viewed not only in a front-face direction (normal direction) but also in various directions (angles). Under the circumstances, there is a demand for a display mode that can realize widening of a viewing angle.

As the display mode of the transmissive liquid crystal display, a TN (Twisted Nematic) mode is most widely used because of its advantages of high definition and high transmittance. In the case where gray-level display is performed in the TN mode, gray level inversion takes place when the screen is viewed at a certain angle and the display quality deteriorates.

For example, in the case of a 90° TN mode liquid crystal display that is capable of 64-level gray scale display, 8 levels of the 64 gray levels are chosen and the luminance (cd/cm$^2$) at each gray level is measured at respective observation points at different angles relative to the normal of the screen. This luminance measurement was carried out by measuring, with use of a luminance meter 2, the luminance at observation points with different off-axis angles θ1 toward a major-axis direction D of liquid crystal molecules relative to a normal Z1 of a liquid crystal display 1. In general, the major-axis direction D of liquid crystal molecules is set to be downward of the screen ("downward viewing angle").

In the TN mode, each gray level is reproduced by controlling the orientation state of liquid crystal molecules by applying an electric field on a pixel-by-pixel basis. In this case, as shown in FIG. 2, when the off-axis angle θ1 is gradually increased toward the major-axis direction D of liquid crystal molecules, that is, toward the lower side of the screen, gray level inversion occurs at a certain off-axis angle.

Specifically, the luminance versus off-axis angle curve associated with each gray level has a minimum value. In addition, since the orientation state of liquid crystal molecules varies from gray level to gray level, the minimum value varies from gray level to gray level. Consequently, at a certain off-axis angle, the luminance of a gray level that is close to black may be higher than the luminance of a gray level that is close to white ("gray level inversion"). As the off-axis angle, at which the gray level inversion occurs, becomes closer to the normal direction (front-face direction of the screen), the screen becomes more unsightly, leading to degradation in image quality.

In order to prevent gray level inversion, wide-viewing-angle liquid crystal displays that adopt an IPS (In-Plane Switching) mode or an MVA (Multi-domain Vertical Alignment) mode have been put to practical use. However, in these liquid crystal displays, the transmittance is low and the drive voltage is high. Since it is difficult to realize low cost and high luminance, there is a demand for improvement of these displays.

On the other hand, there has been proposed an anisotropic light scattering film having light scattering properties that depend on light incidence angles. The light scattering film has such characteristics that the haze value of 80% or more is obtained with respect to light that is incident with an incidence angle in a specified range (e.g. between 0° and 60°) and the haze value of 20% or less is obtained with respect to light that is incident with an incidence angle in a symmetrically opposite range (between −60° and 0°) (see, e.g. Jpn. Pat. Appln. KOKAI Publication No. 2000-171619).

The above-described light scattering film, however, has such characteristics that a high haze value is obtained with respect to light that is incident with incidence angles in a wide range. Consequently, unnecessary light scattering occurs, which may lead to degradation in transmittance or blurring of a display image. Thus, the display quality may deteriorate.

BRIEF SUMMARY OF THE INVENTION

The present invention has been made in consideration of the above-described problems, and the object of the invention is to provide a liquid crystal display that can be manufactured at low cost and can have a high display quality.

According to a first aspect of the present invention, there is provided a liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate, wherein inversion of luminance at respective gray levels occurs within four levels of 64 gray levels in a case where an off-axis angle toward a major-axis direction of the liquid crystal molecules relative to a normal of the counter substrate is within 50°.

According to a second aspect of the present invention, there is provided a liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate, wherein the diffusion layer is configured such that the degree of diffusion of transmission light, which passes in one direction, has a maximum value at a predetermined off-axis angle toward a predetermined axial direction relative to the normal of the diffusion layer, and the diffusion layer is disposed such that the predetermined axial direction coincides with the major-axis direction of the liquid crystal molecules.

According to a third aspect of the present invention, there is provided a liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate, wherein the degree of diffusion of the diffusion layer is 80% or more in a case where an off-axis angle toward a major-axis direction of the liquid crystal molecules relative to a normal of the counter substrate is in a range between 30° and 50°, and the degree of diffusion of the diffusion layer is less than 80% in a case where the off-axis angle toward the major-axis direction of the liquid crystal molecules relative to the normal of the counter substrate is in a range between 0° and 30° and in a range over 50°.

The present invention can provide a liquid crystal display that can be manufactured at low cost and can have a high display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a cross-sectional view that schematically shows the structure of the liquid crystal display shown in FIG. 3;

FIG. 5 is a cross-sectional view that schematically shows the structure of a polarizer plate that is applicable to the liquid crystal display shown in FIG. 4;

DETAILED DESCRIPTION OF THE INVENTION

A liquid crystal display according to an embodiment of the present invention will now be described with reference to the accompanying drawings.

Figure 3:
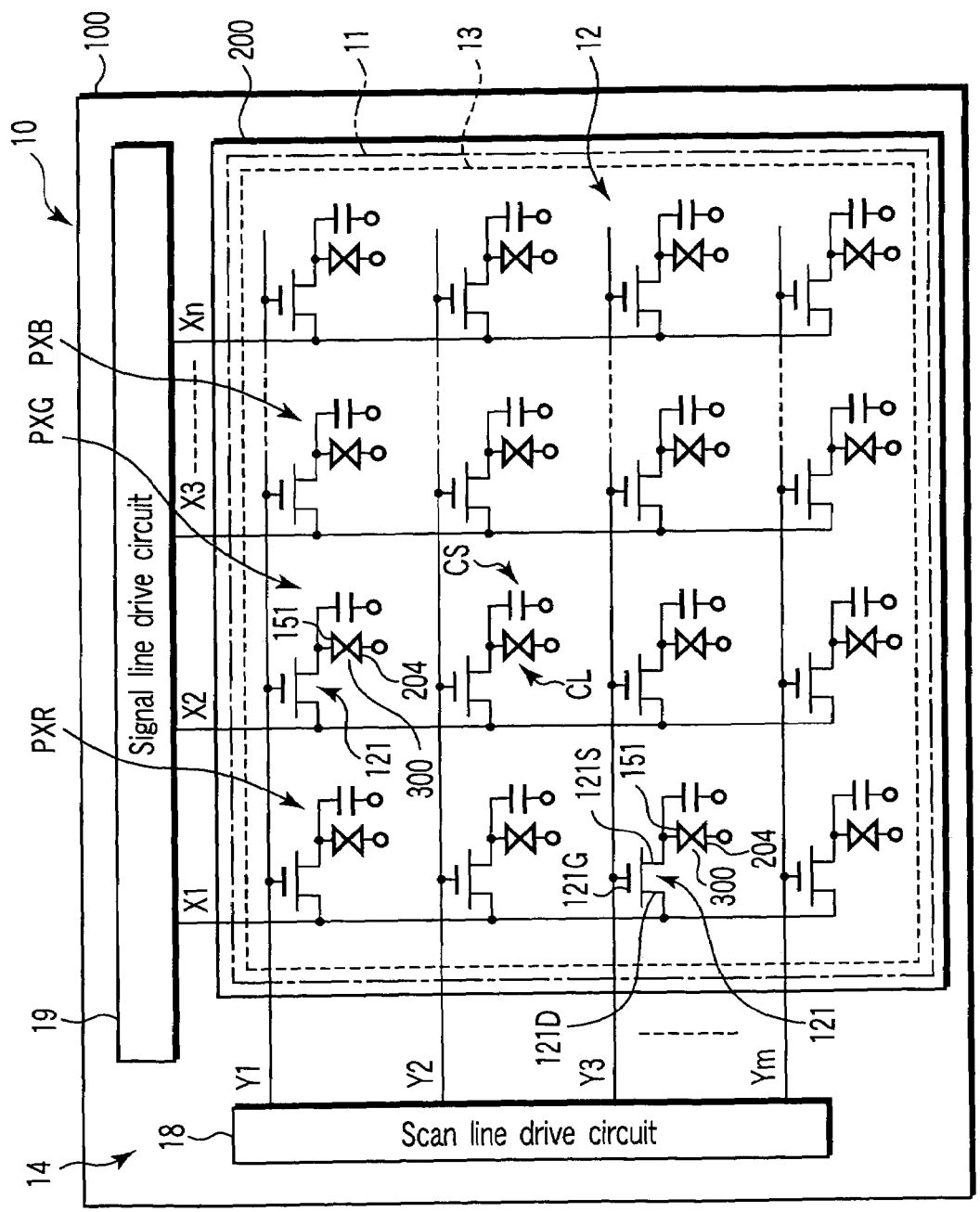
FIG. 3 schematically shows the structure of a liquid crystal display according to an embodiment of the present invention.

As is shown in FIG. 3, a liquid crystal display, for example, an active-matrix liquid crystal display, includes a liquid crystal panel 10. The liquid crystal display panel 10 is configured such that a liquid crystal layer is held between a pair of substrates. Specifically, the liquid crystal display panel 10 comprises an array substrate 100, an counter substrate 200 that is disposed to be opposed to the array substrate 100, and a liquid crystal layer 300 that is held between the array substrate 100 and counter substrate 200 and includes liquid crystal molecules.

The array substrate 100 and counter substrate 200 are attached to each other by a seal member 11, with a predetermined cell gap for holding the liquid crystal layer 300 being provided therebetween. The liquid crystal layer 300 is formed of a liquid crystal composition that is sealed between the array substrate 100 and counter substrate 200.

The liquid crystal display panel 10 includes an effective display section 102 for displaying an image, within an inner region surrounded by the seal member 11. The effective display section 12 comprises a plurality of pixels PX (R, G, B) that are arranged in a matrix. The pixels PX comprise red pixels PXR, green pixels PXG and blue pixels PXB. The pixels PX (R, G, B) have basically the same structure and include color layers of associated colors. Specifically, the pixel PXR includes a color layer that is formed of a red resin material. The pixel PXG includes a color layer that is formed of a green resin material. The pixel PXB includes a color layer that is formed of a blue resin material.

The liquid crystal display panel 10 includes a light-shield section 13 that is formed in a picture-frame shape along a peripheral region of the effective display section 12. The light-shield section 13 is formed of a resin material with light shielding properties, for example, a black resin material.

The liquid crystal display panel 10 further includes a circuit section 14 on a peripheral region of the effective display section 12. The circuit section 14 includes at least parts of drive circuits. In this embodiment, the circuit section 14 includes at least a part of a scan line drive circuit 18 that supplies drive signals (scan signals) to an m-number of scan lines Y1 to Ym, and at least a part of a signal line drive circuit 19 that supplies drive signals (video signals) to an n-number of signal lines X1 to Xn.

In the effective display section 12, the array substrate 100 includes an m-number of scan lines Y1 to Ym, an n-number of signal-lines X1 to Xn, an m×n number of switching elements 121, and an m×n number of pixel electrodes 151. In addition, in the effective display section 12, the counter substrate 200 includes a single counter-electrode 204.

The scan lines Y (1-m) are disposed in the row direction of the pixels PX. The signal lines X (1-n) are disposed in the column direction of the pixels PX. The switching elements 121 are provided in association with the respective pixels PX and are disposed near intersections of the scan lines Y and signal lines X. A gate electrode 121G of the switching element 121 is connected to the associated scan line Y (or formed integral with the scan line Y). A drain electrode 121D of the switching element 121 is connected to the associated signal line X (or formed integral with the signal line X). A source electrode 121S of the switching element 121 is connected to the associated pixel electrode 151.

The pixel electrodes 151 are independently provided in the individual pixels and disposed in a matrix in the effective display section 12. Each pixel electrode 151 is connected to the associated switching element 121 in the associated pixel PX. The pixel electrode 151 is formed of an electrically conductive material with light transmissivity, such as ITO (Indium Tin Oxide). The opposed electrode 204 is commonly provided for all the pixels PX. The counter-electrode 204 is opposed to all the m×n pixel electrodes 151 via the liquid crystal layer 300. The counter-electrode 204 is formed of an electrically conductive material with light transmissivity, such as ITO (Indium Tin Oxide).

In the transmissive liquid crystal display panel 10 shown in FIG. 4, the array substrate 100 is formed using an insulating substrate 101 with light transmissivity, such as a glass substrate. In the effective display section 12, the array substrate 100 includes various lines, such as scan lines and signal lines, switching elements and pixel electrodes. In addition, the array substrate 100 includes an orientation film 103 that is disposed to cover the entire effective display section 12. The orientation film 103 is rubbed in a direction 103A at 45° relative to an axis D extending in a downward direction of the liquid crystal display panel 10 (i.e. downward direction of the screen).

On the other hand, the counter substrate 200 is formed using an insulating substrate 201 with light transmissivity, such as a glass substrate. In the effective display section 12, the counter substrate 200 includes the counter-electrode, etc. Further, the counter substrate 200 includes an orientation film 205 that is disposed to cover the entire effective display section 12. The orientation film 205 is rubbed in a direction 205A at 45° relative to the axis D. The rubbing direction 205A is perpendicular to the rubbing direction 103A of the orientation film 103.

A polarizer plate PL1 is provided on the outer surface of the array substrate 100 in the liquid crystal display panel 10. A polarizer plate PL2 is provided on the outer surface of the counter substrate 200. Further, a diffusion layer is disposed between a surface 200A of the counter substrate 200 and a surface PL2A of the polarizer plate PL2. In this embodiment, as shown in FIG. 5, the polarizer plate PL2 is configured to include a diffusion layer DF. Alternatively, a film-like diffusion layer, which is separate from the polarizer plate PL2, may be provided.

The polarizer plate PL2 shown in FIG. 5 includes three protection layers 501, 502 and 503. The polarizer plate PL2 is configured to include an analyzer 504 that is disposed between the protection layers 501 and 502, and the diffusion layer DF that is disposed between the protection layers 502 and 503. The polarizer plate PL2 is fixed by attaching an outer surface 501A of the protection layer 501 to the surface 200A of the counter substrate 200. Thus, the surface PL2A of the polarizer plate PL2 corresponds to an outer surface 503A of the protection layer 503. The polarizer plate PL1 includes a polarizer that is disposed between two protection layers.

In the 90° TN mode single-domain liquid crystal display panel 10, backlight emitted from a backlight unit 400 illuminates the liquid crystal display panel 10 from the back side of the array substrate 100. The backlight, which has passed through the polarizer plate PL1 on the array substrate 100 side, is incident on the liquid crystal panel 10. The incident light is modulated through the liquid crystal layer 300 and emanates from the counter substrate 200 side. The polarizer plate PL2 selectively passes the emission light emerging from the counter substrate 200. Thereby, an image is displayed on the effective display section 12 of the liquid crystal display panel 10.

Figure 6:
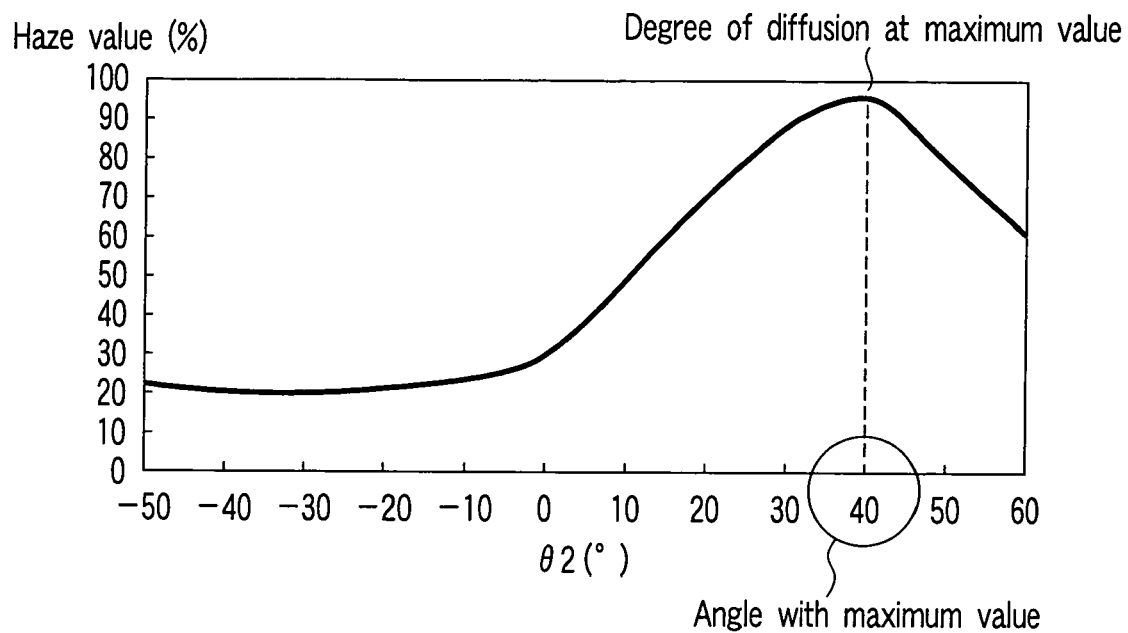
FIG. 6 is a graph showing an example of characteristics of the haze value of a diffusion layer, which is included in the polarizer plate shown in FIG. 5, in relation to an off-axis angle (incidence angle) θ2.

The diffusion layer DF, which is applied here, is configured to have directivity such that the degree of diffusion of transmission light, which is transmitted in one direction, takes a maximum value at a predetermined off-axis angle with an inclination toward a predetermined axial direction relative to the normal of the diffusion layer DF. For example, the diffusion layer DF has properties as shown in FIG. 6. In FIG. 6, the abscissa indicates an incidence angle $\theta2$ (°) of incident light that is incident on the diffusion layer DF, and the ordinate indicates the degree of diffusion. The degree of diffusion is expressed by a haze value (%).

Figure 7:
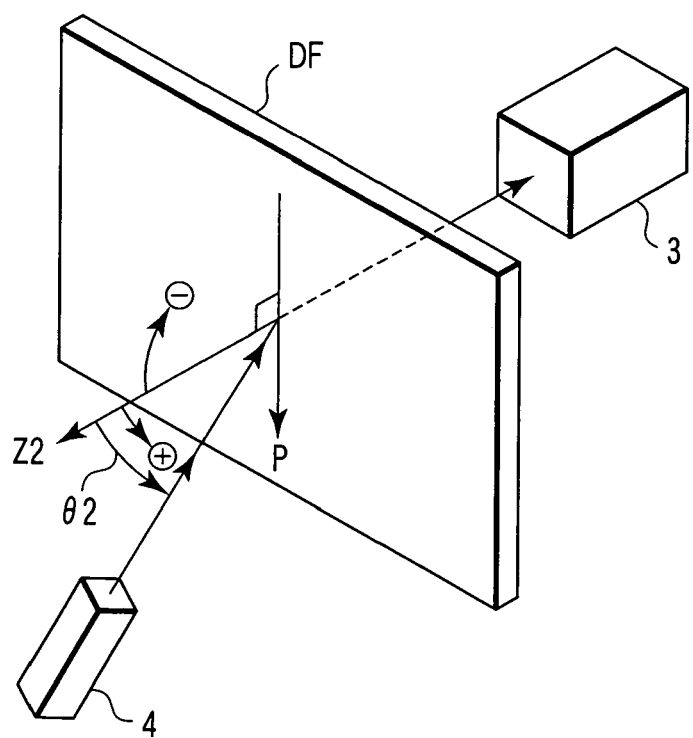
FIG. 7 is a view for explaining the principle for measuring the haze value of the diffusion layer.

As is shown in FIG. 7, the haze value is measured using a haze measuring device 3. A light source 4 is disposed on a side opposite to the haze measuring device 3, with the diffusion layer DF interposed. The haze measuring device 3 is fixed in a normal direction Z2 of the diffusion layer DF. With this setting, the haze value of transmission light that emerges from the diffusion layer DF is measured in the state in which the light source 4 is situated at an off-axis angle $\theta2$ that is varied toward a predetermined axis P relative to the normal Z2 of the diffusion layer DF. The off-axis angle $\theta2$ corresponds to an angle formed between the normal Z2 and the direction of the light source 4, and the direction of the normal Z2 is set at 0°. An off-axis angle $\theta2$, which is on the positive side of the predetermined axis P relative to the normal Z2, is indicated by a plus (+) sign, and an off-axis angle $\theta2$, which is on the negative side of the predetermined axis P relative to the normal Z2, is indicated by a minus (−) sign.

The diffusion layer DF with the characteristics shown in FIG. 6 can diffuse transmission light with a highest haze value at an incidence angle $\theta2$ of about 40°. The haze value in this case was 95%. In other words, the degree of diffusion takes a maximum value at an off-axis angle of 40°. When the incidence angle $\theta2$ is 0°, that is, the angle of the normal Z2, the diffusion layer DF has a low haze value of about 30%.

In the liquid crystal display according to the present embodiment, the diffusion layer DF with the characteristics shown in FIG. 6 is disposed such that the direction of the predetermined axis P thereof coincides substantially with the major-axis direction of liquid crystal molecules, that is, the direction of the axis D extending vertically downwards of the liquid crystal display panel 10.

Figure 1:
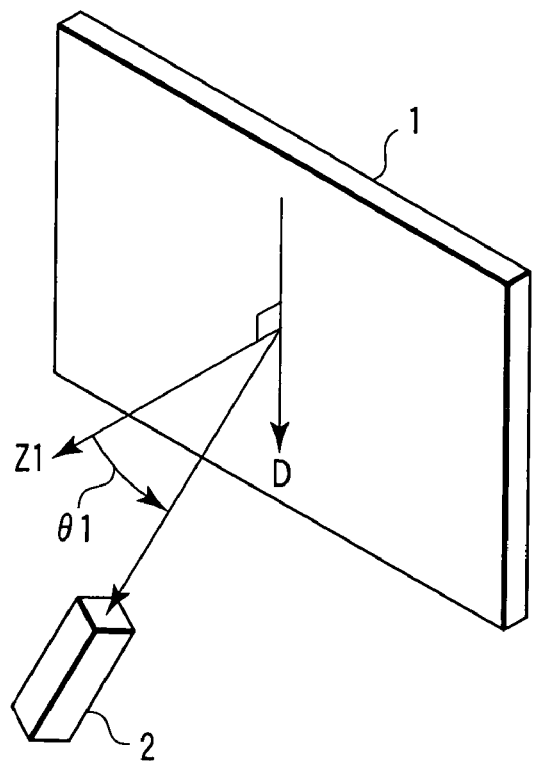
FIG. 1 is a view for explaining a principle for measuring the luminance of a liquid crystal display.

As regards the liquid crystal display with the above-described structure, 8 levels of the 64 gray levels are chosen and the luminance (cd/cm$^2$) of each gray level is measured at respective observation points at different angles relative to the normal of the screen in the same manner as described in connection with the prior art. The method of measuring the luminance is the same as described referring to FIG. 1.

Figures 8, 9:
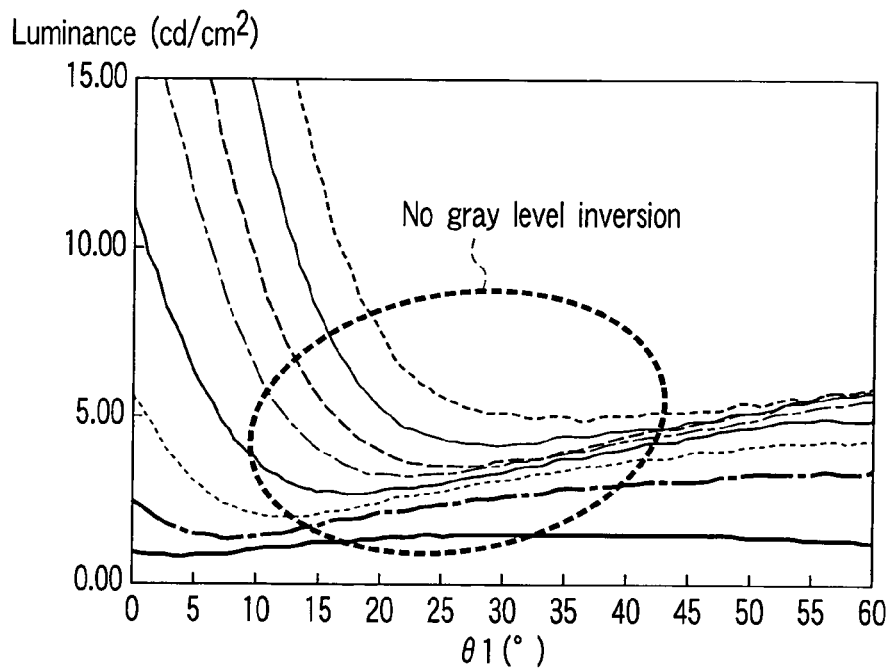
FIG. 8 is a graph showing a measurement result of the luminance in relation to an off-axis angle θ1 at each gray level in a liquid crystal display that adopts the polarizer plate shown in FIG. 5.
FIG. 9 shows a measurement result of an inversion beginning angle and a front-face luminance with respect to a plurality of samples in which set conditions of the diffusion layers are different.

FIG. 8 shows a luminance distribution in the case of gradually increasing the off-axis angle $\theta1$ toward the major-axis direction D of liquid crystal molecules, that is, downwards of the screen. The luminance versus off-axis angle curve associated with each gray level has a minimum value. By virtue of the adoption of the diffusion layer DF that provides a maximum haze value when transmission light is incident at an incidence angle $\theta2$ of about 40°, the inclination of the curve at each gray level becomes gentler in the vicinity of the off-axis angle $\theta1$ of 40°. Accordingly, the minimum value of luminance at each gray level can be shifted to the large off-axis angle θ1 side, and occurrence of the gray level inversion at the small off-axis angle θ1 can be suppressed, compared to the conventional liquid crystal display. Therefore, a liquid crystal display with high display quality can be provided.

The above-described embodiment is directed to the case of using the diffusion layer DF with which the degree of diffusion takes a maximum value (i.e. the haze value is 95%) at a predetermined off-axis angle of 40°. However, the effect of suppressing gray level inversion varies depending on where the predetermined off-axis angle at which the degree of diffusion takes a maximum value is set, and what degree of diffusion is obtained at that time.

Figure 2:
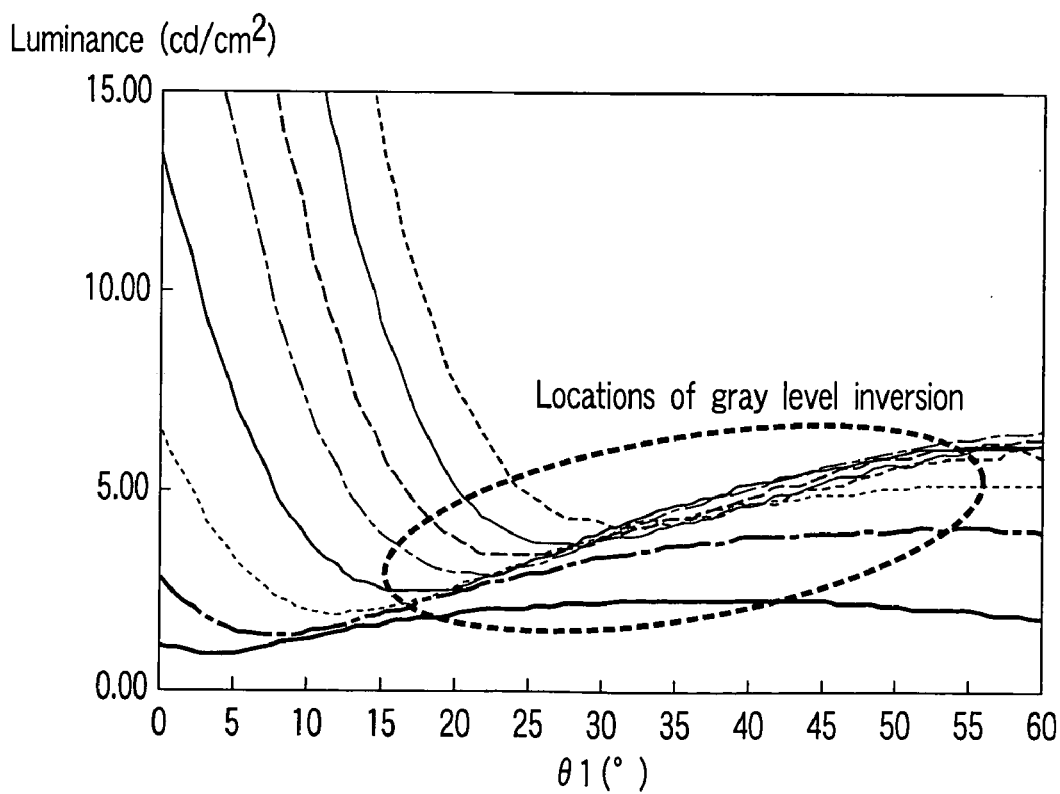
FIG. 2 is a graph showing an example of a measurement result of the luminance in relation to an off-axis angle θ1 at each gray level in a conventional liquid crystal display.

If the predetermined off-axis angle θ2 at which the degree of diffusion takes a maximum value is set at an angle at which gray level inversion occurs, the gray level inversion suppressing effect can be exhibited. It is desirable that the gray level inversion be suppressed over a widest possible off-axis angle θ2. Preferably, the predetermined off-axis angle θ2 with the maximum value of the degree of diffusion should be set in a range between 15° and 55°. More preferably, the predetermined off-axis angle θ2 at which the degree of diffusion takes a maximum value should be set in a range between 30° and 50°, since gray level inversion tends to take place remarkably in the range between 30° and 50° of the angle θ1, as shown in FIG. 2.

The effect of improving the gray level inversion is greater as the degree of diffusion is higher. However, if the degree of diffusion is increased to such a level that the haze value exceeds 99%, such problems will occur that a displayed character may blur or the luminance lowers. If the maximum value of the haze value is less than 85%, the gray level inversion suppressing effect decreases, and gray level inversion will occur at an angle close to the normal direction (i.e. front-face direction). It is thus preferable that the maximum value of the degree of diffusion be 85% to 99% in terms of the haze value.

As regards the normal direction, in consideration of occurrence of blurring or a decrease in luminance, it is desirable that the degree of diffusion be not so high. Thus, the haze value in the normal direction of the diffusion layer DF should preferably be 75% or less, and more preferably 50%.

As has been described above, for individual liquid crystal displays, it is necessary to set an optimal value of the predetermined off-axis angle at which the applied diffusion layer DF takes a maximum value of the degree of diffusion, an optimal value for the maximum value of the degree of diffusion, and an optimal value for the degree of diffusion in the normal direction.

Based on the above considerations, it is desirable to adopt a diffusion layer DF that has a high degree of diffusion in a relatively narrow range of off-axis angle θ. In particular, it was confirmed that a very high effect of suppressing gray level inversion was attained by adopting a diffusion layer DF that has a degree of diffusion of 80% or more in the range of off-axis angle θ2 between 30° and 50° and has a degree of diffusion of 90% or less (preferably 80% or less) in the range of off-axis angle θ2 between 0° and 30° and in the range of θ2 over 50°.

Next, as regards six samples of 90° TN mode liquid crystal displays wherein conditions of applicable diffusion layers are varied, the angle at which gray level inversion occurs ("inversion beginning angle" (°)) and front-face luminance (%) were measured and compared. The inversion beginning angle refers to an angle at which inversion of luminance occurs at more than one location, in the case where the luminance is measured while the off-axis angle θ is gradually increased from the angle of the normal direction (θ1=0°) with respect to each of eight gray levels, that is, each of gray levels obtained by equally dividing 64 gray levels by 8. If the gray level inversion beginning angle is measured with respect to each of the 64 gray levels, this angle is substantially equal to an angle at which inversion of luminance occurs within four gray levels. A front-face luminance is a relative value, which is obtained when the measurement value relating to a sample X is set at 100%. The sample X includes a diffusion layer wherein a maximum value of the degree of diffusion is set at 80% in terms of the haze value and the predetermined off-axis angle with this maximum value is set at 20°. A sample A includes a diffusion layer wherein a maximum value of the degree of diffusion is set at 85% in terms of the haze value and the predetermined off-axis angle with this maximum value is set at 20°. A sample B includes a diffusion layer wherein a maximum value of the degree of diffusion is set at 95% in terms of the haze value and the predetermined off-axis angle with this maximum value is set at 20°. A sample C includes a diffusion layer wherein a maximum value of the degree of diffusion is set at 85% in terms of the haze value and the predetermined off-axis angle with this maximum value is set at 40°. A sample D includes a diffusion layer wherein a maximum value of the degree of diffusion is set at 95% in terms of the haze value and the predetermined off-axis angle with this maximum value is set at 40°. A sample E includes a diffusion layer wherein a maximum value of the degree of diffusion is set at 85% in terms of the haze value and the predetermined off-axis angle with this maximum value is set at 60°. A sample F includes a diffusion layer wherein a maximum value of the degree of diffusion is set at 95% in terms of the haze value and the predetermined off-axis angle with this maximum value is set at 60°.

The measurement result is shown in FIG. 9. From the measurement result, it was confirmed that there is a tendency that the inversion beginning angle increases as the predetermined off-axis angle increases. In any of the samples, a relatively high front-face luminance was obtained. However, even if the predetermined off-axis angle is the same, the front-face luminance is lower in the samples (B, D, F) that include the diffusion layers with higher degrees of diffusion. As regards the sample F, a front-face luminance, which corresponds to 90% of the reference sample X, could not be obtained.

Of the samples, the sample D has conditions wherein the front-face luminance is 90% or more and the gray level inversion is most improved. In the sample D, the gray level inversion beginning angle was 50°. It was thus confirmed that the inversion of luminance at respective gray levels occurs within four levels of the 64 gray levels when the off-axis angle toward the major-axis direction of liquid crystal molecules relative to the normal of the liquid crystal display is within 50°.

In the above-described embodiment, the polarizer plate PL2 including the diffusion layer DF shown in FIG. 5 is employed. Alternatively, it is possible to use a polarizer plate that includes a viewing-angle compensation layer disposed between the surface of the counter substrate 200 and the surface of the polarizer plate PL2.

Figures 10, 11:
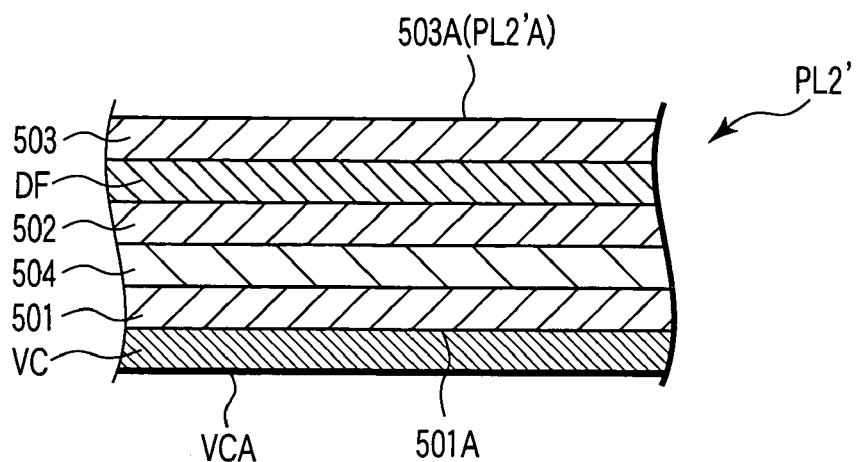
FIG. 10 is a cross-sectional view that schematically shows the structure of another polarizer plate that is applicable to the liquid crystal display shown in FIG. 4.
FIG. 11 shows a measurement result of an inversion beginning angle and a front-face luminance with respect to a plurality of samples in which set conditions of the diffusion layers are different.

Specifically, a polarizer plate PL2', as shown in FIG. 10, includes three protection layers 501, 502 and 503. The polarizer plate PL2' includes an analyzer 504 disposed between the protection layers 501 and 502, and a diffusion layer DF with directivity, which is disposed between the protection layers 502 and 503. Further, the polarizer plate PL2' includes a viewing-angle compensation layer VC that is provided on a surface 501A of the protection layer 501. The polarizer plate PL2' is fixed by attaching an outer surface VCA of the viewing-angle compensation layer VC to the surface 200A of the counter substrate 200. In other words, the viewing-angle compensation layer VC is disposed between the surface 200A of the counter substrate 200 and the surface PL2A of the polarizer plate PL2'. In the example shown in FIG. 10, the polarizer plate PL2' is configured to include the viewing-angle compensation layer VC. Alternatively, a film-like viewing-angle compensation layer, which is separate from the polarizer plate PL2', may be provided. With the provision of the viewing-angle compensation layer VC, the viewing angle contrast, that is, the ratio in luminance between white display and black display at a time of varying the off-axis angle θ1, increases, and the gray level inversion improvement effect is enhanced.

As regards six samples of 90° TN mode single-domain liquid crystal displays wherein viewing-angle compensation layers are added and the conditions of diffusion layers are varied similarly as in the case described with reference to FIG. 9, the angle at which gray level inversion occurs in the major-axis direction of liquid crystal molecules relative to the normal of the liquid crystal display ("inversion beginning angle" (°)) and front-face luminance (%) were measured and compared.

In this case, a Super-Wide View film (manufactured by Fuji Photo Co., Ltd.) was used as the viewing-angle compensation layer. With the provision of the viewing-angle compensation layer, the inversion of luminance at respective gray levels occurred within four levels of the 64 gray levels when the off-axis angle toward almost all azimuth directions relative to the normal of the liquid crystal display is within 40°. However, as regards azimuth directions near the major-axis direction of liquid crystal molecules, the inversion of luminance occurred at more than four levels of the 64 gray levels. By contrast, when the polarizer plate, in which the viewing-angle compensation layer and the diffusion layer that meets predetermined conditions are combined, is employed, the inversion of luminance occurred within four levels of the 64 gray levels even with respect to azimuth directions near the major-axis direction of liquid crystal molecules.

The measurement result is shown in FIG. 11. From the measurement result, it was confirmed that there is a tendency that the inversion beginning angle increases as the predetermined off-axis angle increases. In any of the samples, a relatively high front-face luminance was obtained. However, even if the predetermined off-axis angle is the same, the front-face luminance is lower in the samples (B, D, F) that include the diffusion layers with higher degrees of diffusion. As regards the sample F, a front-face luminance, which corresponds to 90% of the reference sample X, could not be obtained.

Of the samples, the sample D has conditions wherein the front-face luminance is 90% or more and the gray level inversion is most improved. In the sample D, the gray level inversion beginning angle was increased to 65°. It was thus confirmed that the inversion of luminance at respective gray levels occurs within four levels of the 64 gray levels when the off-axis angle toward the major-axis direction of liquid crystal molecules relative to the normal of the liquid crystal display is within 65. Moreover, it was confirmed that with the viewing-angle compensation layer combined, the inversion of luminance at respective gray levels occurred within four levels of the 64 gray levels when the off-axis angle toward almost all azimuth directions relative to the normal of the liquid crystal display is within 40°.

As has been described above, according to the liquid crystal display of this embodiment, which is of the single-domain TN mode, the diffusion layer with directivity is included between the counter substrate and the surface of the liquid crystal display panel. Thereby, the minimum value of luminance can be shifted to the large off-axis angle side when the off-axis angle relative to the normal is varied at respective gray levels, and gray level inversion can be suppressed. Therefore, deterioration in display quality can be prevented even when the screen is viewed over a wide viewing angle. Furthermore, a high drive voltage as in the IPS mode or MVA mode is not required, and high luminance can be realized at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate,
wherein inversion of luminance at respective gray levels occurs within four levels of 64 gray levels in a case where an off-axis angle toward a major-axis direction of the liquid crystal molecules relative to a normal of the counter substrate is within 50°.

2. The liquid crystal display according to claim 1, wherein the inversion of luminance at respective gray levels occurs within four levels of 64 gray levels in a case where an off-axis angle toward all azimuth directions relative to the normal is within 40°.

3. The liquid crystal display according to claim 1, wherein the diffusion layer is configured such that the degree of diffusion of transmission light, which passes in one direction, has a maximum value at a predetermined off-axis angle toward a predetermined axial direction relative to the normal of the diffusion layer.

4. The liquid crystal display according to claim 3, wherein the diffusion layer is disposed such that said predetermined axial direction coincides with the major-axis direction of the liquid crystal molecules.

5. The liquid crystal display according to claim 3, wherein the predetermined off-axis angle is in a range between 15° and 55°.

6. The liquid crystal display according to claim 3, wherein the maximum value of the degree of diffusion is between 85% and 99%.

7. The liquid crystal display according to claim 3, wherein the diffusion layer has a degree of diffusion of 75% or less in the normal direction of the diffusion layer.

8. The liquid crystal display according to claim 1, wherein the polarizer plate includes the diffusion layer.

9. The liquid crystal display according to claim 1, further comprising a viewing-angle compensation layer that is disposed between the surface of the counter substrate and the surface of the polarizer plate.

10. A liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate, wherein the diffusion layer is configured such that the degree of diffusion of transmission light, which passes in one direction, has a maximum value at a predetermined off-axis angle toward a predetermined axial direction relative to the normal of the diffusion layer, and the diffusion layer is disposed such that said predetermined axial direction coincides with the major-axis direction of the liquid crystal molecules.

11. A liquid crystal display of a single-domain TN mode, comprising an array substrate with electrodes provided independently for individual pixels, an counter substrate that is disposed to be opposed to the array substrate, a liquid crystal layer that is held between the array substrate and the counter substrate and includes liquid crystal molecules, polarizer plates that are disposed on outer surfaces of the array substrate and the counter substrate respectively, and a diffusion layer that is disposed between a surface of the counter substrate and a surface of the polarizer plate, wherein the degree of diffusion of the diffusion layer is 80% or more in a case where an off-axis angle toward a major-axis direction of the liquid crystal molecules relative to a normal of the counter substrate is in a range between 30° and 50°, and the degree of diffusion of the diffusion layer is less than 80% in a case where the off-axis angle toward the major-axis direction of the liquid crystal molecules relative to the normal of the counter substrate is in a range between 0° and 30° and in a range over 50°.

* * * * *